United States Patent
Lee et al.

(10) Patent No.: US 10,466,366 B2
(45) Date of Patent: Nov. 5, 2019

(54) OPTIMIZING METHOD FOR VEHICLE COOPERATIVE OBJECT POSITIONING AND VEHICLE COOPERATIVE POSITIONING APPARATUS

(71) Applicant: AUTOMOTIVE RESEARCH & TESTING CENTER, Lugang Chen, Changhua Hsien (TW)

(72) Inventors: Chao-Yang Lee, Changhua Hsien (TW); Che-Cheng Chang, Changhua Hsien (TW)

(73) Assignee: AUTOMOTIVE RESEARCH & TESTING CENTER, Lugang Chen, Changhua Hsien (TW)

( * ) Notice: Subject to any disclaimer, the term of this patent is extended or adjusted under 35 U.S.C. 154(b) by 696 days.

(21) Appl. No.: 14/982,408

(22) Filed: Dec. 29, 2015

(65) Prior Publication Data
US 2017/0184726 A1    Jun. 29, 2017

(51) Int. Cl.
*G01S 19/51*    (2010.01)

(52) U.S. Cl.
CPC .................... *G01S 19/51* (2013.01)

(58) Field of Classification Search
CPC ...... G01S 19/51; G01S 19/423; G01S 19/425; G01S 19/43; G01S 19/40; G01S 19/41; G01S 19/45; G01S 13/06; G01S 13/50; G01S 13/52; G01S 13/58; G01S 13/86; G01S 13/867; G01S 13/93; G01S 13/931; G01S 2013/9325; G01S 2013/9332; G01S 2013/9353; G01S 2013/936
See application file for complete search history.

(56) References Cited

U.S. PATENT DOCUMENTS

| 2009/0237293 A1* | 9/2009 | Sakuma | G01S 5/0072 |
| | | | 342/146 |
| 2010/0164789 A1* | 7/2010 | Basnayake | G01S 5/0072 |
| | | | 342/357.23 |
| 2013/0057436 A1* | 3/2013 | Krasner | G01S 19/11 |
| | | | 342/464 |

(Continued)

OTHER PUBLICATIONS

SAE International, "DSRC Implementation Guide", Feb. 16, 2010.

*Primary Examiner* — Bernarr E Gregory
*Assistant Examiner* — Daniel P Malley, Sr.
(74) *Attorney, Agent, or Firm* — patenttm.us

(57) ABSTRACT

A vehicle cooperative object positioning optimization method includes steps of: receiving an information package by the local vehicle and the information package having a vehicle original coordinate and at least one object original coordinate provided by a neighbor vehicle; performing a time delay compensation for the vehicle original coordinate and the object original coordinate to acquire a vehicle coordinate and an object coordinate of the neighbor vehicle respectively; performing an optimizing procedure to optimize the vehicle coordinate and the object coordinate respectively so as to obtain the vehicle optimized coordinate and the object optimized coordinate. Therefore, the vehicle optimized coordinate and the object optimized coordinate possess higher accuracy than the original coordinate information detected by the GPS receiver and other sensors. And that helps to determine a distribution of the environmental objects with improved precision and to enhance driving safety.

16 Claims, 13 Drawing Sheets

(56) References Cited

U.S. PATENT DOCUMENTS

| | | | |
|---|---|---|---|
| 2014/0210644 A1* | 7/2014 | Breed | G01S 17/936 340/905 |
| 2015/0177003 A1* | 6/2015 | Ho | G01S 19/23 701/408 |
| 2015/0323675 A1* | 11/2015 | Munoz | G01S 19/22 342/357.43 |
| 2016/0260328 A1* | 9/2016 | Mishra | G08G 1/163 |

* cited by examiner

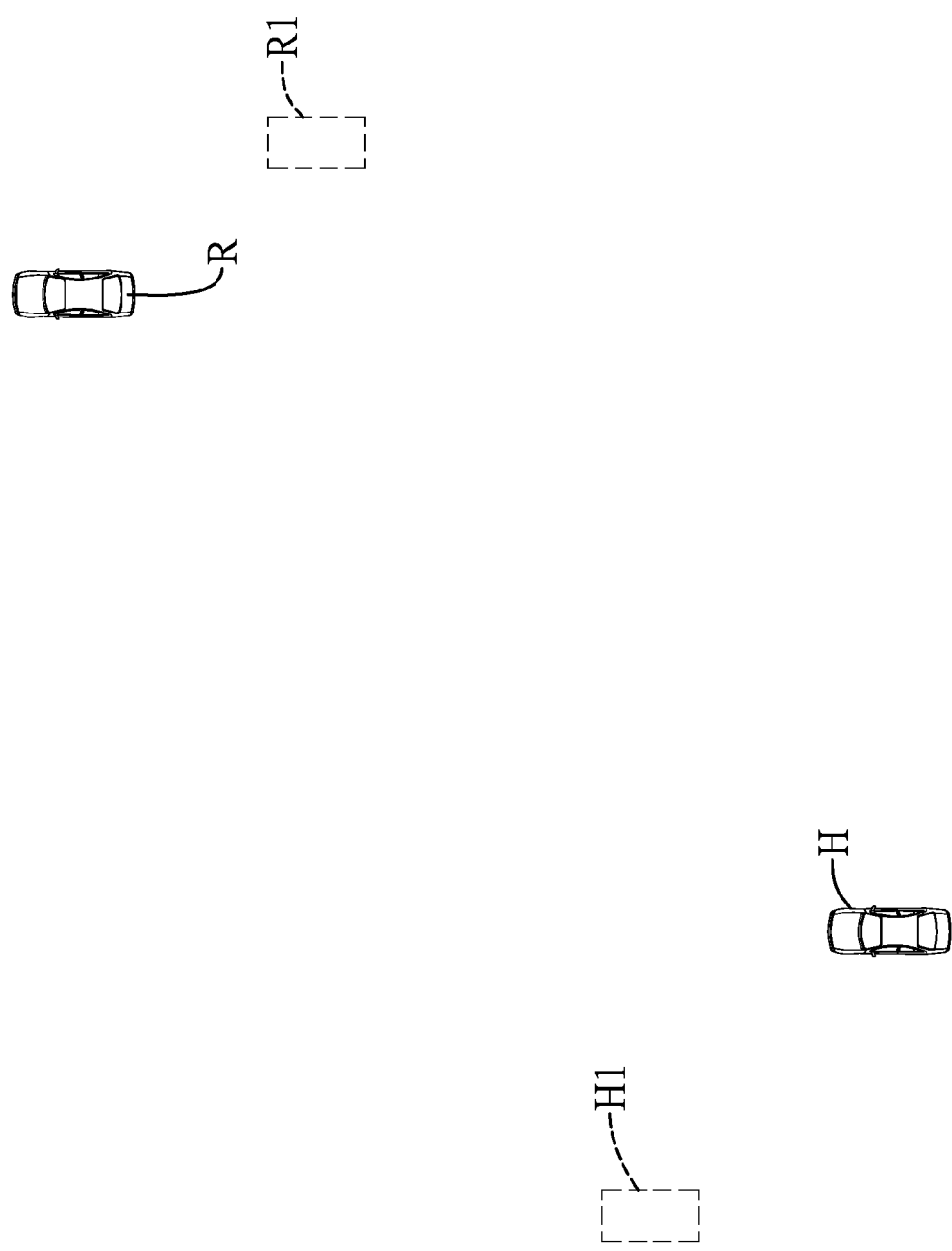

OPTIMIZING METHOD FOR VEHICLE COOPERATIVE OBJECT POSITIONING AND VEHICLE COOPERATIVE POSITIONING APPARATUS

BACKGROUND OF THE INVENTION

1. Field of the Invention

The present invention relates to an object positioning method, and more particularly relates to an optimizing method for vehicle cooperative object positioning.

2. Description of Related Art

A technique to install sensors in a vehicle to detect surrounding areas is well developed. For example, the sensors, such as Global Positioning System (GPS), radar, lidar, vehicle dashboard recorder, and etc., can provide different environmental information. For a vehicle itself, the environmental information received from the sensors is limited. For example, with reference to FIG. 9, in a crossroad, the sensors on a first vehicle 101 driving along a longitudinal direction path may observe environmental information along the longitudinal direction. For instance, the sensors on the vehicle can sense objects (such as pedestrians, vehicles, animals, and so on) that fast pass through the crossroad. However, for a second vehicle 102 driving along a horizontal path, the observation of the sensors on the second vehicle 102 is limited by the position and blocked by environmental buildings to have a blind spot. Even if the second vehicle 102 has sensors, the second vehicle 102 may not observe an emergency situation from the object 200 and may hit the object 200. Therefore, if the vehicle relies on the sensors to provide the environmental information only, the blind spot is existed in environmental circumstance.

Accordingly, a vehicle cooperative positioning method is developed. The cooperative idea is to share the information detected by the environmental sensors, such as Road side unit (RSU), or surrounding vehicles, so a local vehicle can receive the information from other vehicles to extend sensing range thereof. With the example in FIG. 9, if the second vehicle 102 can receive the information provided by the first vehicle 101, the object suddenly appearing from a right hand side at the crossroad can be seen by the second vehicle 102 and the second vehicle 102 may have enough time to response.

However, a technical drawback of the conventional cooperative positioning technique is that the accuracy thereof is not good enough. With the example shown in FIG. 10, the first vehicle 101 is the local vehicle, and the second vehicle 102, the third vehicle 103 and the fourth vehicle 104 are neighbor vehicles. For the second vehicle 102 as an example, the second vehicle 102 includes a commercial GPS and a camera. A positioning error of the commercial GPS is about 5-15 meters and the positioning error of the camera is about 5 meters. Therefore, the second vehicle 10 detects a position for itself with a GPS error range A1. When the second vehicle 102 detects the position of the third vehicle 103 by the camera, the position of the third vehicle 103 detected by the camera includes a camera error range A2. Therefore, if the second vehicle 102 shares the detected position information of the third vehicle 103 to the first vehicle 101, the position information of the third vehicle received by the first vehicle 101 includes an error accumulation problem, such as the GPS and a camera accumulating error range A3.

Furthermore, if the first vehicle shares the position information of the third vehicle 103 again to the fourth vehicle 104 and the position error of the first vehicle 101 is also added, more error accumulation values are generated in the position information received in the fourth vehicle 104. Therefore, when the information is transferred and shared many times, the positioning accuracy of the object is decreased and the information is worthless as the reference.

SUMMARY OF THE INVENTION

Since the conventional cooperative position technique includes the accuracy problem of the positioning information, an objective of the present invention is to provide a method for vehicle cooperative object positioning optimization method to extend a sensing range of the vehicle and improve the accuracy of the positioning information so as to enhance vehicle driving safety.

In order to achieve the aforementioned objective, an optimizing method for vehicle cooperative object positioning, the optimizing method performed by a cooperative positioning apparatus installed within a local vehicle and comprising steps of:

receiving an information package by the local vehicle, wherein the information package has a vehicle original coordinate and at least one object original coordinate provided by one of a plurality of neighbor vehicles, and the vehicle original coordinate and the at least one object original coordinate respectively correspond to different positioning accuracies;

performing a time delay compensation for the vehicle original coordinate and the at least one object original coordinate to acquire a vehicle coordinate and an object coordinate of one of the neighbor vehicles respectively;

performing an optimizing procedure, and the optimizing procedure having:

comparing a vehicle coordinate of the local vehicle and the vehicle coordinate of one of the neighbor vehicles to determine which one of the vehicle coordinates of the local vehicle and the neighbor vehicle has a higher positioning accuracy;

performing an optimizing calculation for the vehicle coordinate with the higher positioning accuracy at first, and then performing the optimizing calculation for the vehicle coordinate with a lower positioning accuracy, wherein the optimizing calculation comprises:

(a) calculating a plurality of reference positions in accordance with the vehicle coordinate of the local vehicle and the vehicle coordinate of one of the neighbor vehicles; and (b) calculating one of a plurality of vehicle optimizing coordinate in accordance with a plurality of weights of the reference positions;

optimizing the object coordinates of the local vehicle and the neighbor and the optimizing step comprising steps of:

comparing the vehicle original coordinate and the vehicle optimizing coordinate of the neighbor vehicle to obtain a difference;

compensating the object coordinate provided by one of the neighbor vehicles in accordance with the difference to acquire an object optimizing coordinate of one of the neighbor vehicles;

comparing the vehicle original coordinate and the vehicle optimizing coordinate of the local vehicle to obtain the difference;

compensating the object coordinate provided by the local vehicles in accordance with the difference to acquire the object optimizing coordinate of the local vehicle.

According to the optimizing method in the present invention, the optimized vehicle coordinate and the optimized object coordinate of the local vehicle and the neighbor vehicle can be obtained and the optimized coordinate is much more close to the practical position. Therefore, it is helpful to determine the objects at the environmental environment and a distribution of the vehicles precisely so as to enhance the vehicle driving safety.

BRIEF DESCRIPTION OF THE DRAWINGS

FIG. 6A is a schematic diagram of a first reference position H1 acquired in the present invention;

DETAILED DESCRIPTION OF THE PREFERRED EMBODIMENT

Figure 1:
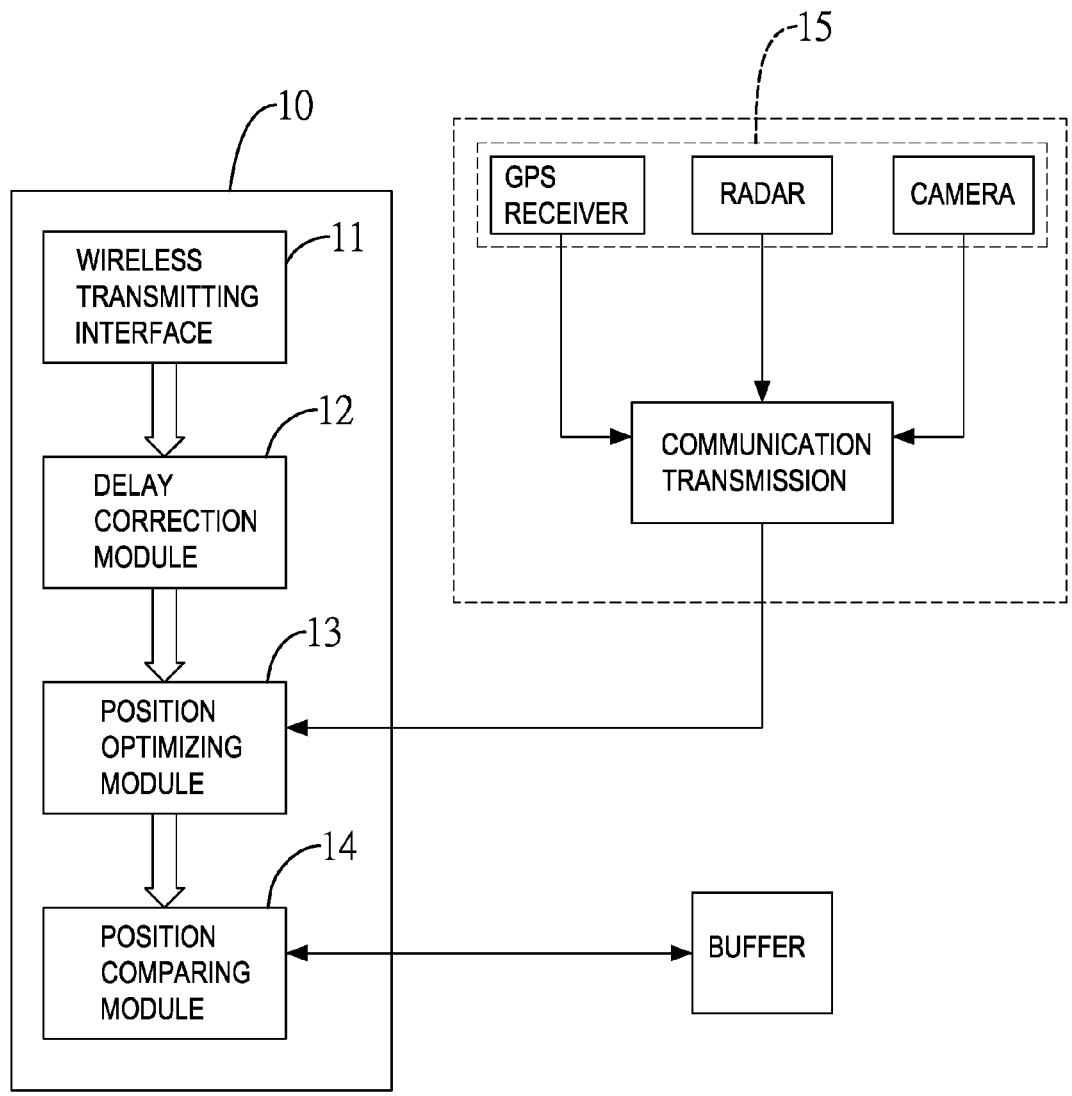
FIG. 1 is a block diagram of a cooperative positioning apparatus in the present invention.

With reference to FIG. 1, the present invention uses a vehicle detector 15 including a GPS receiver and many different sensors, such as radar, camera, and etc. mounted in each of the vehicles to acquire a coordinate of the local vehicle and environmental information surrounding the local vehicle, and shares the coordinate of the local vehicle and the environmental information to the neighbor vehicles via a wireless communication technique. Therefore, for any one of the vehicles, a dual wireless communication is used to transmit and receive the information between the local vehicle and the surrounding vehicles.

Figure 2:
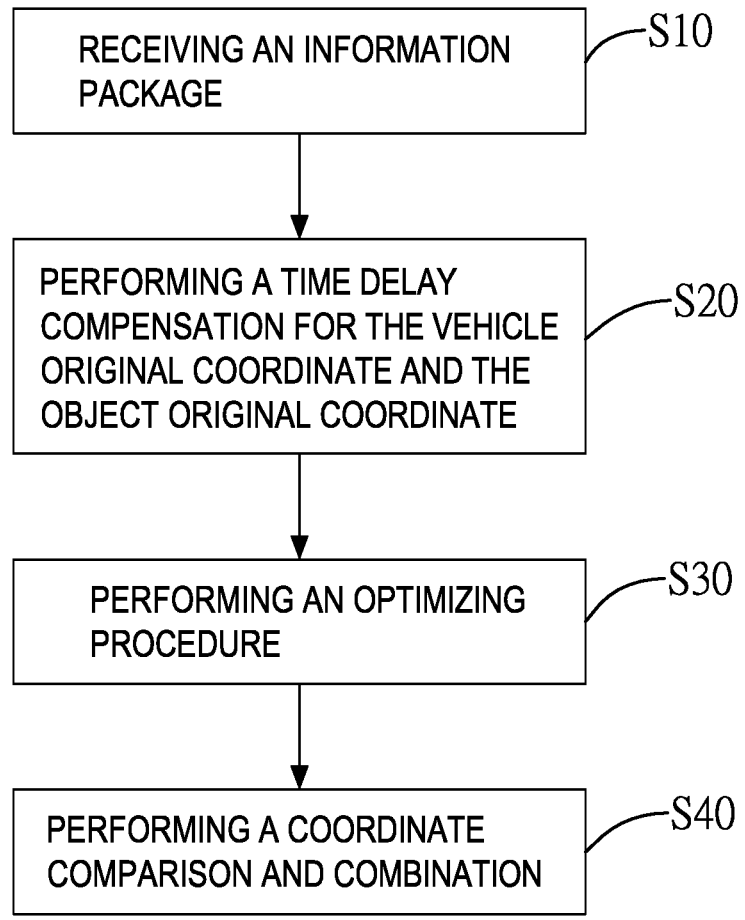
FIG. 2 is a flow chart of an optimizing method for vehicle cooperative object positioning in the present invention.

The vehicle in the present invention includes a cooperative positioning apparatus 10, and the cooperative positioning apparatus 10 includes a wireless transmitting interface 11, a delay correcting module 12, a position optimizing module 13, and a position comparing module 14. The cooperative positioning apparatus 10 is to perform an optimizing method for vehicle cooperative object positioning as shown in FIG. 2 and the method include following steps:

S10: receiving an information package. The information package includes a vehicle original coordinate and at least one object original coordinate of a neighbor vehicle, and positioning accuracies respectively in the vehicle original coordinate and the at least one object original coordinate;

S20: performing a time delay compensation for the vehicle original coordinate and the at least one object original coordinate to acquire a vehicle coordinate and an object coordinate respectively;

S30: performing an optimizing procedure;

S40: performing a coordinate comparison and combination.

Figure 3:
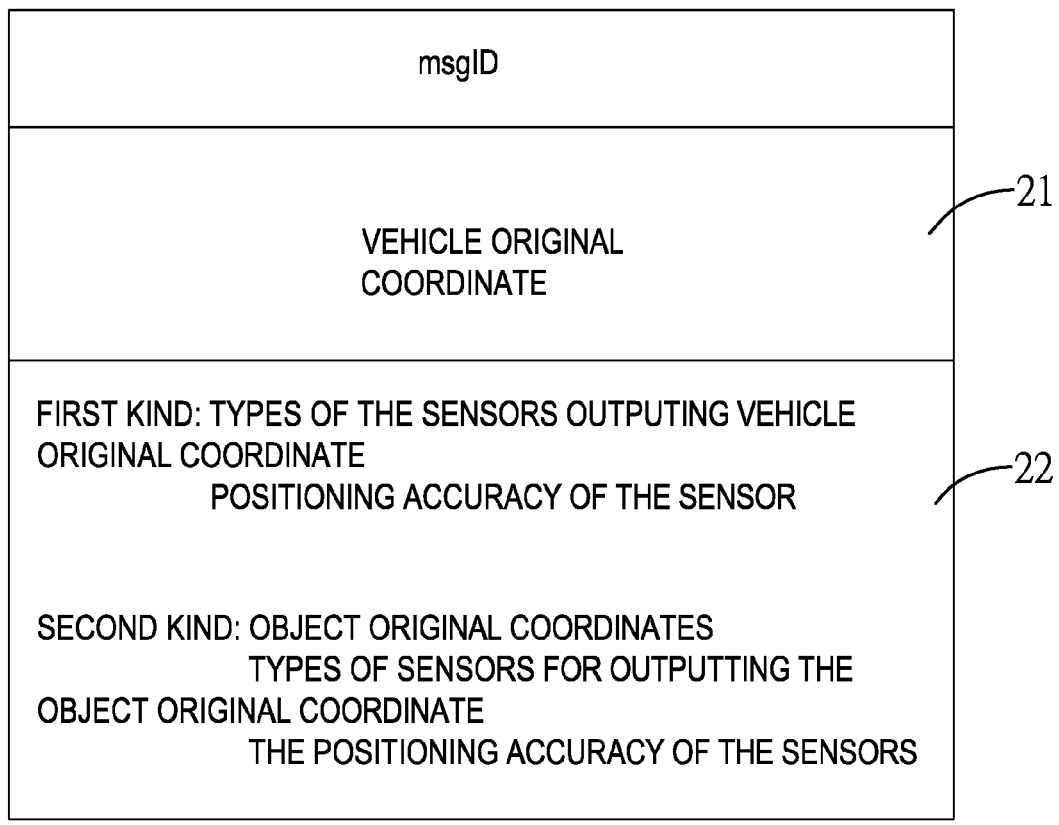
FIG. 3 is a diagram of a format of BSM information package in the present invention.

In step S10, the wireless transmitting interface 11 is configured to perform information dual direction transmission between the local vehicle and the neighbor vehicle. In the present embodiment, a Dedicated Short Range Communication (DSRC) is used to transmit and receive the information package periodically between the vehicles. A format of the information package is a basic safety message (BSM) package. With reference to FIG. 3, the format of the information package includes an msgID field, a first part (Part I), and a second part (Part II). The first part 21 is defined to be necessary information and includes basic safety message, which is a part necessarily included in the information package. The second part 22 is an optional part, and the user can add information in the second part 22 when necessary. The second part 22 belongs to a self define portion.

The first part 21 of the BSM information package includes a latitude and longitude coordinate information of the vehicle, which is the original coordinate of the local vehicle, and the original coordinate is the position of the vehicle detected by the GPS receiver within the local vehicle.

In the second part 22 of the BSM information package, two kinds of information are added in the present invention. The first kind of information is types of the sensors (such as RTK, GPS and so on), which output the vehicle original coordinate, and the positioning accuracy of the sensor. The second kind of information includes object original coordinates, types of sensors for outputting the object original coordinate, or the positioning accuracy of the sensors. The object original coordinate is the information of the objects detected by those sensors (such as radar, lidar, camera and so on) in the local vehicle and the objects may be vehicles, pedestrians, moving objects, fixtures, and so on. The local vehicle can transmit the vehicle original coordinate and the object original coordinate of the local vehicle to the neighbor vehicles to use. The local vehicle can also receive the vehicle original coordinate and the object original coordinate from the neighbor vehicles.

Figure 4:
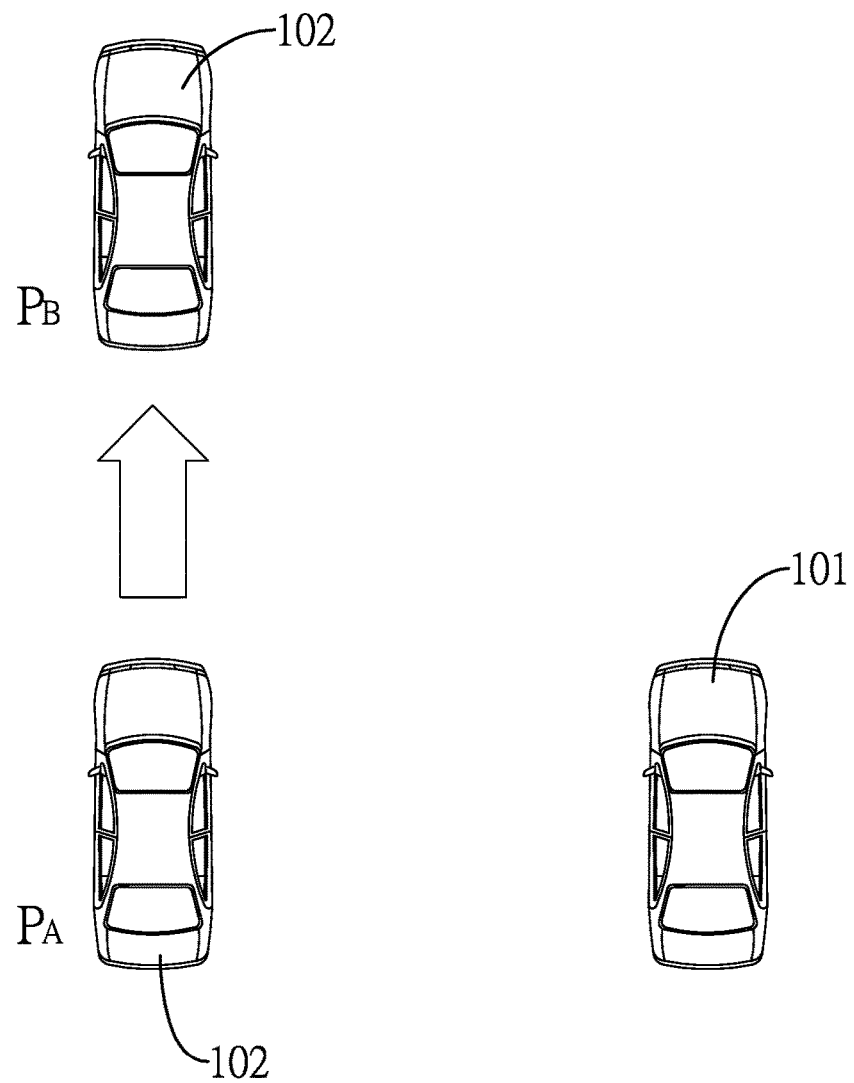
FIG. 4 is a schematic diagram of a time delay compensation performed in the vehicle original position in the present invention.

In step S20, the delay correcting module 12 receives the BSM information package transmitted from the neighbor vehicle via the wireless transmitting interface 11 and acquires the vehicle original coordinate and the object ordinal coordinate of the neighbor vehicle. In addition, the position optimizing module 13 further receives many detective results, such as vehicle coordinate (GPS), object coordinate and so on, provided by the sensor of the local vehicle. With reference to FIG. 4, the first vehicle 101 is called the local vehicle and the second vehicle 102, which is close to the first vehicle 101, is called the neighbor vehicle. When the first vehicle 101 receives the information package transmitted from the second vehicle 102, the first vehicle 101 can calculate a time delay value n between a package transmitting time and a package receiving time, where the package transmitting time and the package receiving time are recorded within the package. Since the second vehicle 102 keeps moving from an original position $P_A$ to a position $P_B$ after the second vehicle 102 transmitted the package, the original coordinate of the second vehicle 102 received by the first vehicle 101 represents the original position $P_A$. Therefore, the delay correcting module 12 calculate a compensation distance for the movement of the second vehicle 102 in accordance with the time delay compensation value n. The original coordinate (the original position $P_A$) pluses the compensation distance to get the instant position $P_B$, and the equation is:

$$P_B = P_A + V \times n, \text{ where } V \text{ is the speed of the second vehicle 102.}$$

When the delay correcting module 12 calculated the instant position $P_B$ of the second vehicle 102, the object original coordinate provided by the second vehicle 102 is also added with the compensation distance of the two positions $P_A$ and $P_B$. After the vehicle original coordinate and the object original coordinate are added with the time compensation distance to be a vehicle coordinate and an object coordinate respectively, the vehicle coordinate and the object coordinate are provided to the position optimizing module 13 for further processing.

Figure 5:
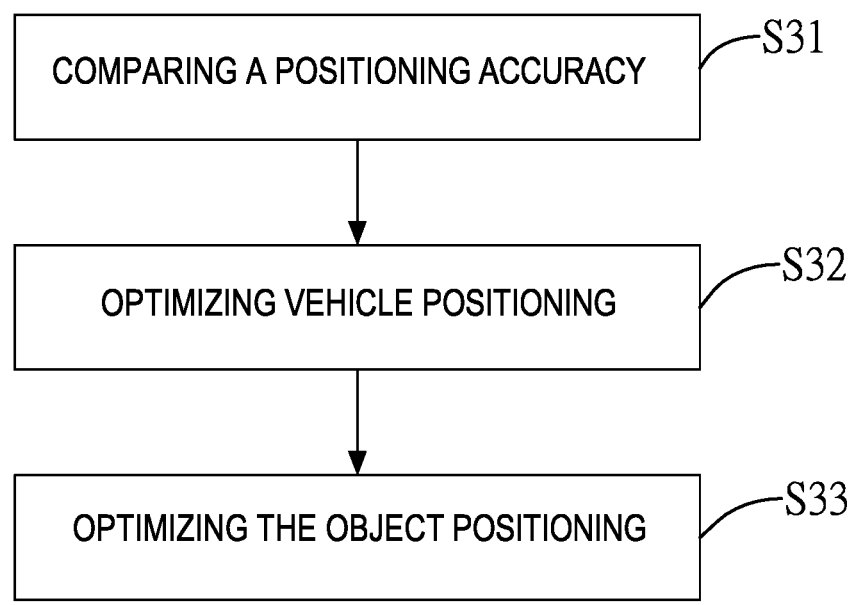
FIG. 5 is a flow chart of an optimizing procedure executed by a position optimizing module in the present invention.

In step S30, the position optimizing module 13 receives the vehicle coordinate and the object coordinate of the neighbor vehicle after compensating and also receives the vehicle coordinate of the local vehicle and the original coordinate detected by the sensor of the local vehicle, and then the position optimizing module 13 performs an optimizing procedure, as shown in FIG. 5 and the optimizing procedure includes the following procedures S31-S33.

S31: comparing a positioning accuracy. The step S31 is to compare the vehicle coordinate of the local vehicle and the vehicle coordinate of the neighbor vehicle to determine which vehicle having a higher accuracy. For example, if the vehicle coordinate of the local vehicle implements a real time kinematic (RTK) measuring device to acquire the coordinate and the vehicle coordinate of the neighbor vehicle is detected by a common GPS receiver, the coordinate provided by the RTK device includes a higher accuracy. For example, if both the local vehicle and the neighbor vehicle implement the same GPS receiver to provide the coordinates, the vehicle with higher accuracy is determined by reliabilities of the two GPS signals. For example, National Marine Electronics Association (NMEA) information within the GPS signal is used to determine which GPS signal includes higher reliability.

S32: optimizing vehicle positioning. After determining which one of the vehicle coordinates in the local vehicle and the neighbor vehicle having a higher accuracy, the vehicle coordinate with higher accuracy performs an optimizing calculation first and then the vehicle coordinate with lower accuracy performs the optimizing calculation. No matter which position information of the local vehicle or the neighbor vehicle performs the optimizing calculation, and the procedures are:

(a) calculating a plurality of reference positions in accordance with the vehicle coordinate of the local vehicle and the vehicle coordinate of the neighbor vehicle; and (b) calculating a vehicle optimizing coordinate in accordance with weights of the reference positions.

In the present embodiment, it is assumed that both of the local vehicle and the neighbor vehicle include GPS receivers and other sensors, and a vehicle optimizing coordinate is calculated by four reference positions. After comparing the vehicle coordinate of the local vehicle H and the vehicle coordinate of the neighbor vehicle, the vehicle coordinate of the local vehicle H includes a higher accuracy. Therefore, as the local vehicle to be the centre, the vehicle coordinate of the local vehicle is optimized in advance and the optimizing steps are described in the following. Firstly, with reference to FIG. 6A, the local vehicle and the neighbor vehicle are represented by H and R respectively. The two vehicles can acquire the vehicle coordinate by the GPS receivers thereof. The local vehicle H implements the vehicle coordinate detected by the GPS receiver to a first reference position H1 and a difference between the first reference position H1 and the real position of the local vehicle H is existed because of an error of the GPS receiver. The vehicle coordinate detected by the GPS receiver of the neighbor vehicle is implemented to be a base position R1.

Figure 6B:
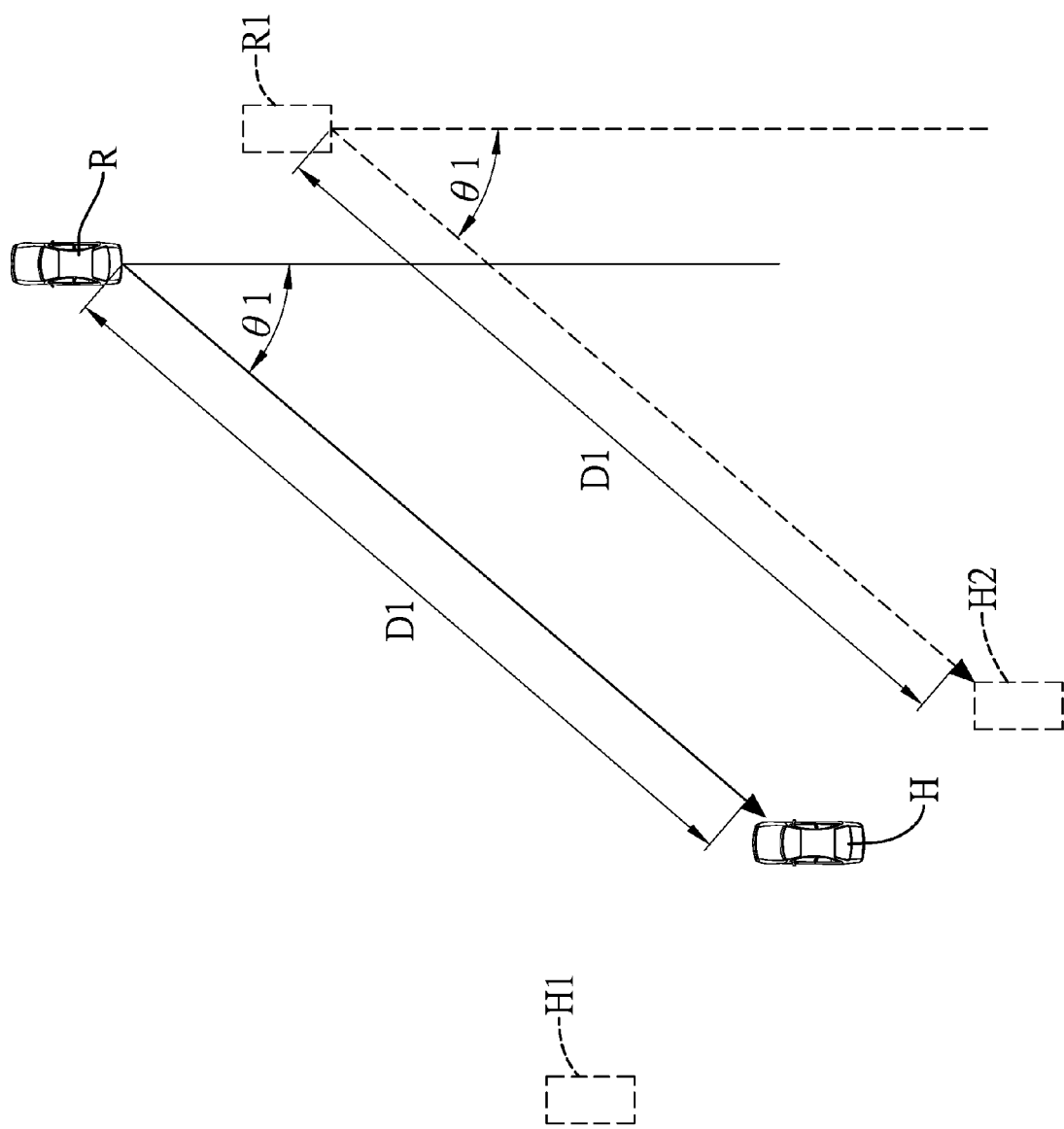
FIG. 6B is a schematic diagram of a first reference position H2 acquired in the present invention.

With reference to FIG. 6B, since the sensor of the neighbor vehicle R can detect the existence of the local vehicle H, a relative distance D1 and a relative angle θ1 between the neighbor vehicle R and the local vehicle H can be known. The neighbor vehicle R implements the reference position thereof to be a normative reference and the relative coordinate of the local vehicle H is converted to be a longitude and latitude coordinate. The longitude and latitude coordinate is used as a second reference coordinate H2. The information package transmitted from the neighbor vehicle R includes the longitude and latitude coordinate of the second reference position H2.

Figure 6C:
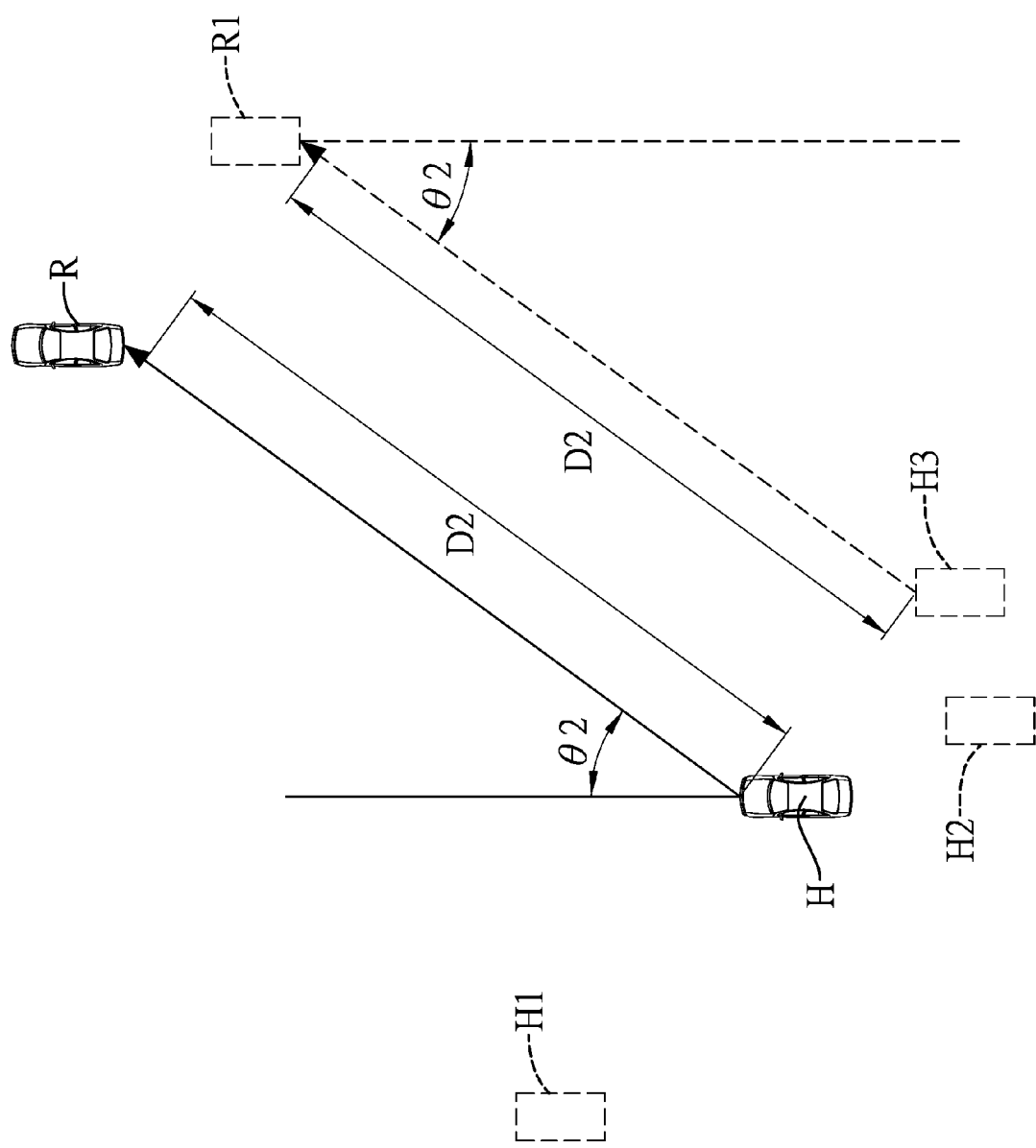
FIG. 6C is a view of a first reference position H3 acquired in the present invention.

With reference to FIG. 6C, since the sensor of the local vehicle can sense the existence of the neighbor vehicle, the relative distance D2 and the relative angle θ2 between the local vehicle H and the neighbor vehicle R can be acquired. After acquiring the relative distance D2 and the relative angle θ2 between the local vehicle H and the neighbor vehicle R, the longitude and latitude coordinate of the local vehicle H can be converted by the base position R1 of the neighbor vehicle R as the base reference to acquire a third reference position H3.

Figure 6D:
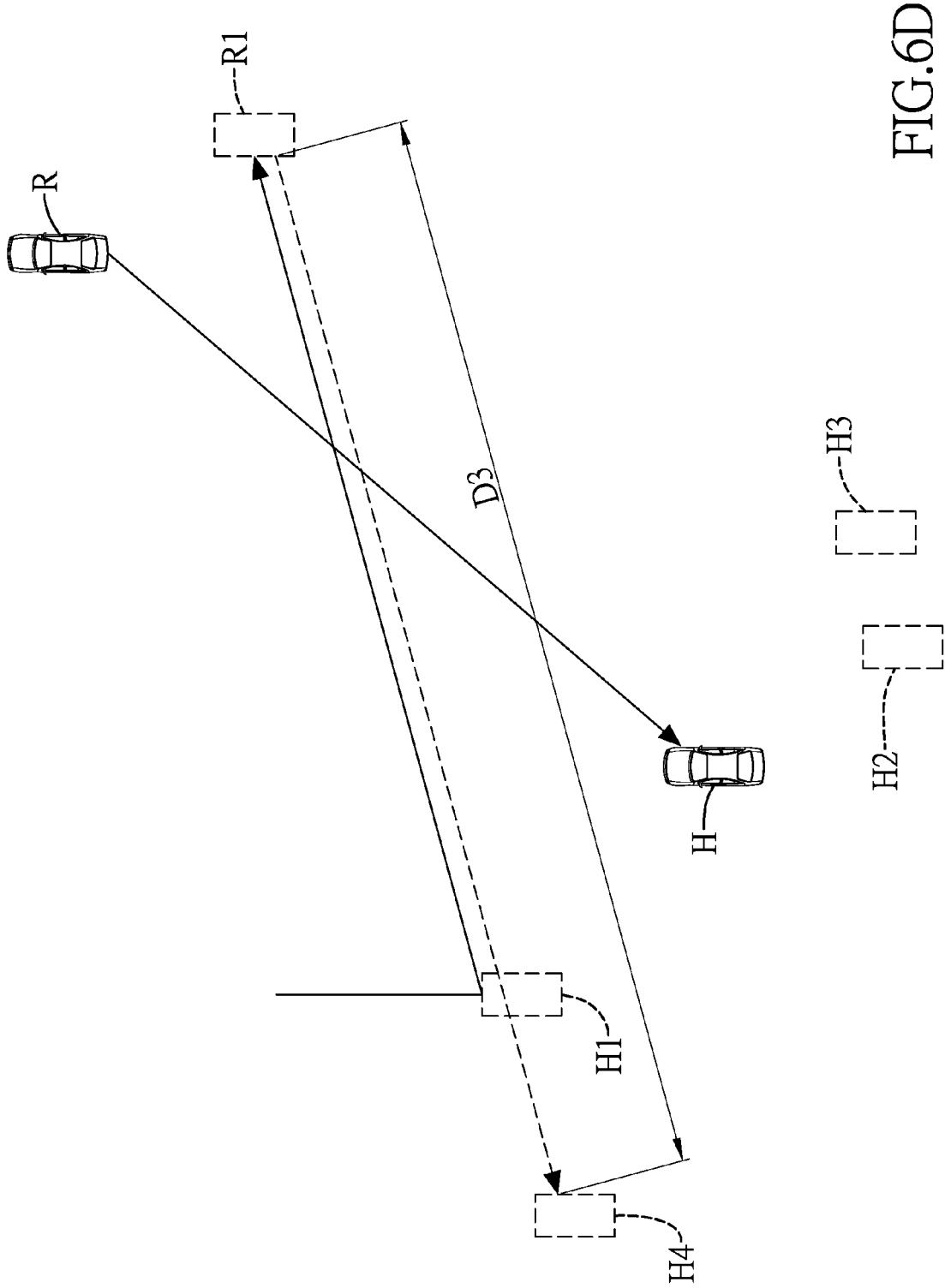
FIG. 6D is a schematic diagram of a first reference position H4 acquired in the present invention.

With reference to FIG. 6D, the information package is transmitted between the neighbor vehicle R and the local vehicle via wireless signal. Therefore, the relative distance between the two vehicles can be calculated in accordance with strength attenuation between the transmitter and the receiver of the wireless signal. For example, a wireless signal power transmitted from the neighbor vehicle is reset to be −10 dBi and the wireless signal power received by the local vehicle H is become −30 dBi. Therefore, the wireless signal between the two vehicles attenuates 20 dBi. Since the attenuation is proportional to the distance and an attenuation relationship table can be established, the relative distance D3 between the two vehicles can be known in accordance with the 20 dBi attenuation or by searching the table. On the other hand, since the vehicle coordinates of the local vehicle H and the neighbor vehicle R are known, the direction of the local vehicle H related to the neighbor vehicle R can be calculated in accordance with a longitudinal extension line between the two positions of the vehicle coordinates. Therefore, according to the base position R1 of the neighbor vehicle R, a fourth reference position H4 is calculated in accordance with the relative distance D3 and the direction.

Figure 7:
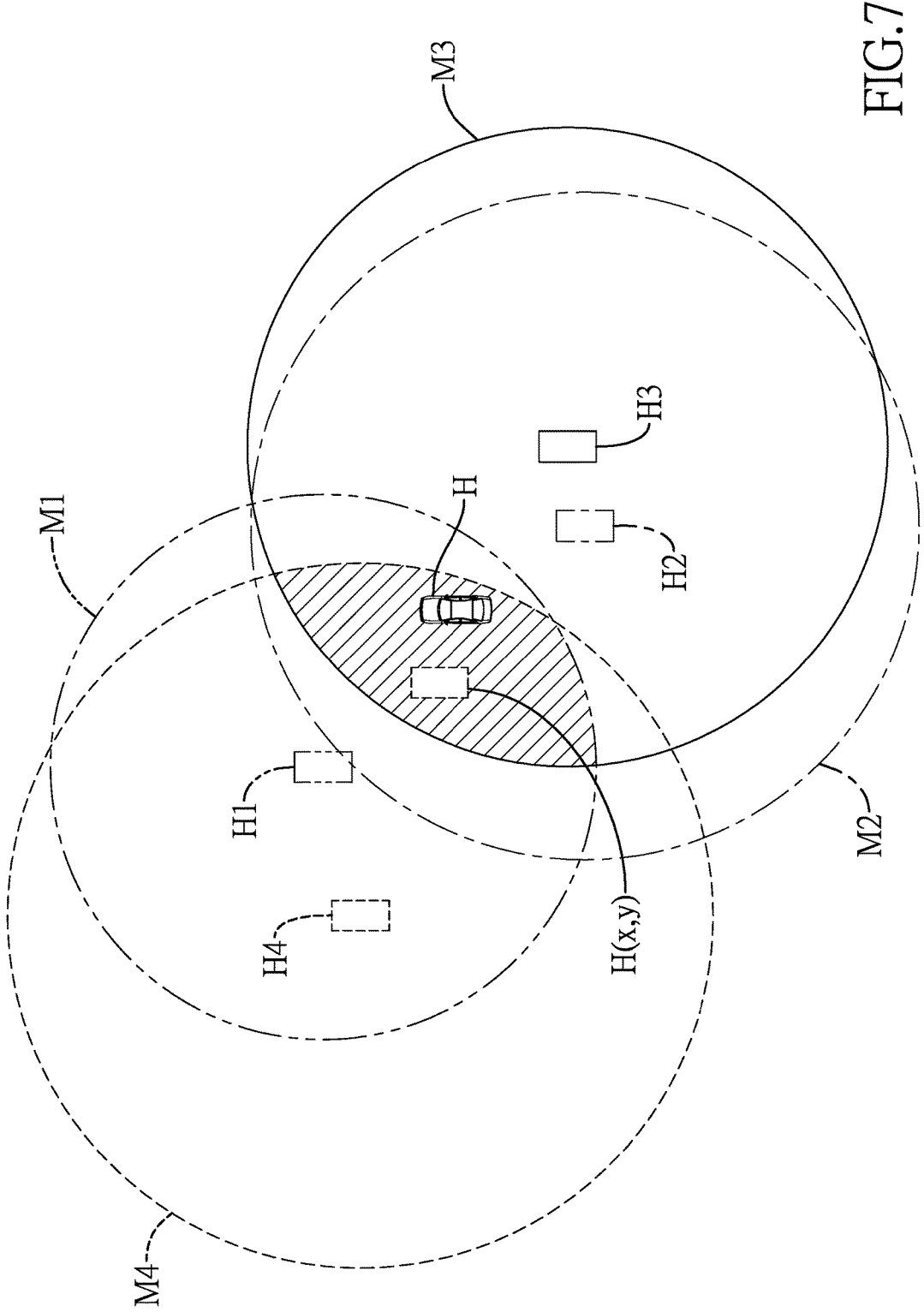
FIG. 7 is a schematic diagram of calculating a vehicle optimizing coordinate by many reference positions in the present invention.

With reference to FIG. 7, after acquiring the first reference position H1-the fourth reference position H4, the first reference position H1-the fourth reference position H4 are used as centers of circles to determine a first covering area M1, a second covering area M2, a third covering area M3 and a fourth covering area M4. The volume at each of the covering areas is determined by the accuracy of the sensor, which is used to detect the reference positions. It is assumed that the GPS receiver in the local vehicle H includes the best accuracy, so the covering area of the first reference position H1 is the smallest. The reference position with higher accuracy includes a higher weight ω. The accuracy is provided by the GPS receiver. If some of the sensors cannot provide the accuracy thereof, the weight is determined in accordance with the distance of the position detected by the sensor. When the distance is far away, the weight is lower. An overlap region (as an oblique lined area in the figure) among the first covering area M1-the fourth covering area M4 is used to calculate a vehicle optimizing coordinate (x, y) in the present invention.

In the step (b), the vehicle optimizing coordinate H (x, y) is calculated in accordance with the weight ω at each of the reference positions and the equation is:

$$H(x, y) = \left(\sum_{i=1}^{m} \omega_i * x_i\right), \left(\sum_{i=1}^{m} \omega_i * y_i\right), \text{ where} \left(\sum_{i=1}^{m} \omega_i = 1\right)$$

In the equation above, m represents a number of the reference positions. In the present embodiment, m=4 and (xi, yi) represents the coordinates of the first reference position H1-the fourth reference position H4 respectively. One of the calculation methods of the weight ω may be Adaboost algorithm or other algorithms.

Instead of the Adaboost algorithm, a calculation method of the weight is provided herein. Firstly, the error values of the first reference position H1-the fourth reference position H4 are 3, 6, 4, and 6 meters respectively. An error inverse proportion algorithm is used to calculate four different weights and the equations are:

Summarizing total error values: $\Sigma_i \varepsilon_i = 3+4+5+6=18$

Respectively calculating differences between the total error values and each of the error values:
$\varphi_i = \Sigma_i \varepsilon_i - \varepsilon_2 = 18-3=15$ Calculating a summary of the differences: $\Sigma_i \varphi_i = 15+13+12+14=54$ The four weights are:

$$\omega_1 = \frac{\varphi_1}{\sum_i \varphi_i} = \frac{15}{54} = 0.277777$$

$$\omega_2 = \frac{\varphi_2}{\sum_i \varphi_i} = \frac{14}{54} = 0.25925$$

$$\omega_3 = \frac{\varphi_3}{\sum_i \varphi_i} = \frac{12}{54} = 0.22222$$

$$\omega_4 = \frac{\varphi_4}{\sum_i \varphi_i} = \frac{13}{54} = 0.24074$$

The vehicle optimizing coordinate H(x, y) of the vehicle H:

$$H(x, y) = \left(\sum_{i=1}^{m} \omega_i * x_i\right), \left(\sum_{i=1}^{m} \omega_i * y_i\right),$$

where (xi, yi) represents the coordinates of the four reference positions and H(x, y) represents the vehicle optimizing coordinate.

After the vehicle optimizing coordinate of the local vehicle H is calculated, the optimizing coordinate of the neighbor vehicle R is calculated in accordance with the center of the neighbor vehicle R. The calculation procedure is as the aforementioned description and the roles of the local vehicle and the neighbor vehicle are switched. In other words, the information of the neighbor vehicle is used as the information of the local vehicle in the aforementioned calculation and the information of the local vehicle is used as the information of the neighbor vehicle in the aforementioned calculation. Therefore, the vehicle optimizing coordinate R(x, y) of the neighbor vehicle can also be calculated.

S33: optimizing the object positioning. The object coordinates detected by the sensors in the neighbor vehicle R and the local vehicle H are optimized. In the local vehicle H, since the vehicle optimizing coordinate H(x, y) of the local vehicle is calculated, the difference between the vehicle original coordinate and the vehicle optimizing coordinate H(x, y) of the local vehicle H is determined in accordance with the object coordinate detected by the sensor of the local vehicle H. When the object optimizing coordinate of the object detected by the sensor of the local vehicle H is calculated, the difference determined by the sensor of the local vehicle H is used to perform a compensation so as to acquire the object optimizing coordinate. The optimizing calculation of the object coordinate detected by the local vehicle is finished. Similarly, in the neighbor vehicle R, since the vehicle optimizing coordinate of the neighbor vehicle is calculated, the difference between the vehicle original coordinate and the vehicle optimizing coordinate of the neighbor vehicle R is determined. When the object optimizing coordinate of the object detected by the sensor of the neighbor vehicle R is recalculated, the difference is used to perform the compensation in the object coordinate detected by the sensor of the neighbor vehicle so as to acquire the object optimizing coordinate.

Figure 8:
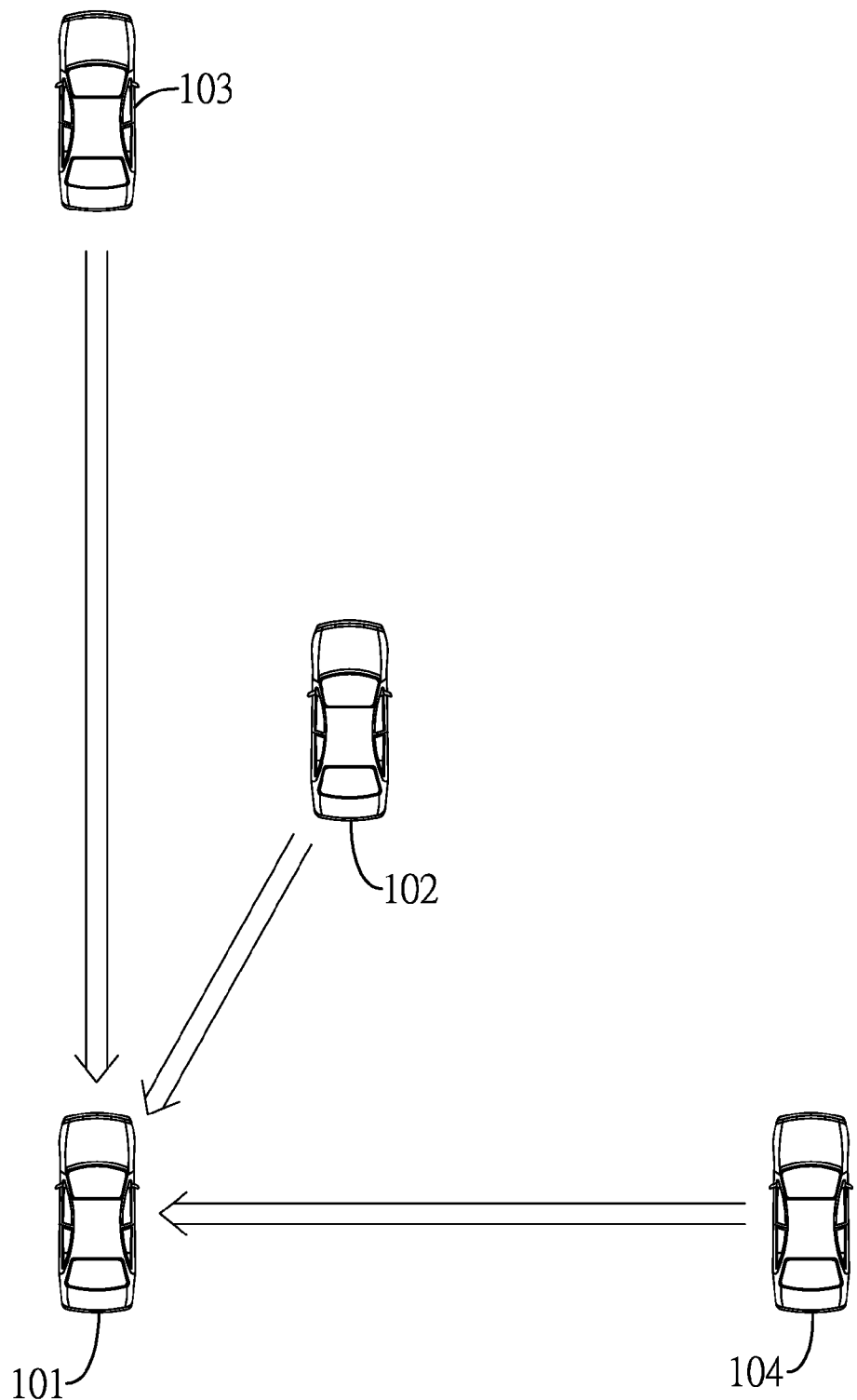
FIG. 8 is a schematic diagram of sharing information in many different vehicles in the present invention.
Figure 9:
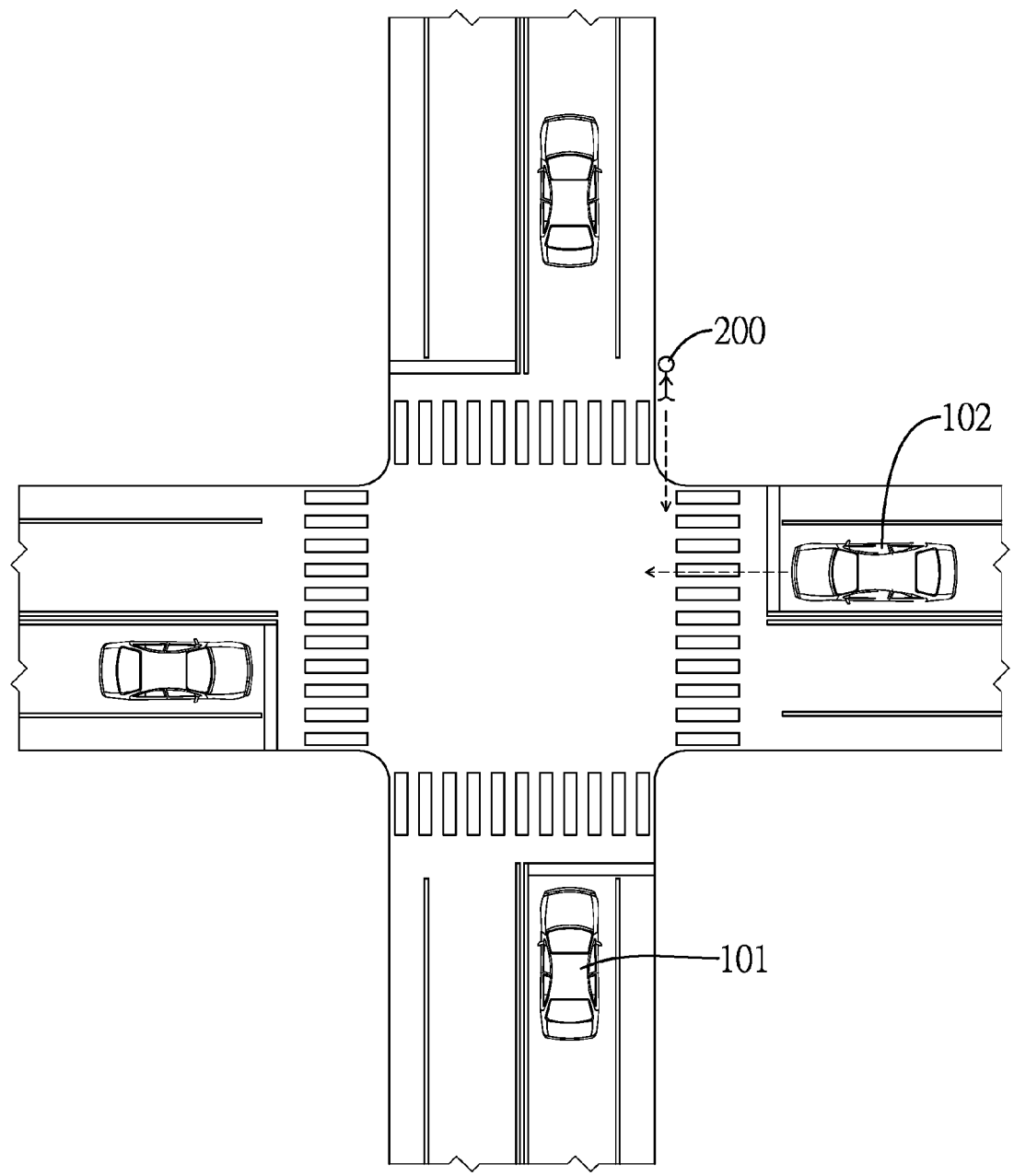
FIG. 9 is a schematic diagram of the local vehicle passing through a crossroad.
Figure 10:
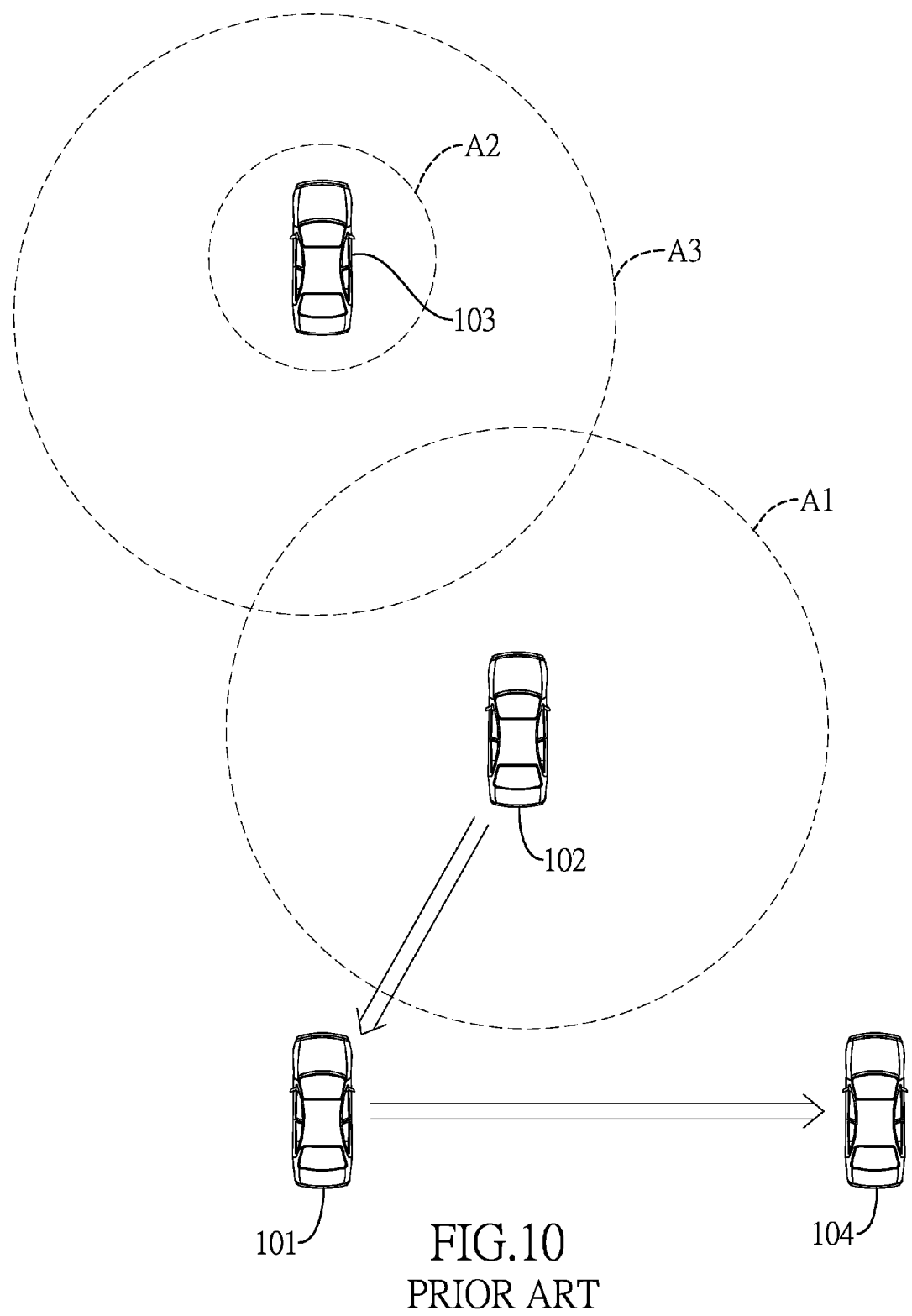
FIG. 10 is a schematic diagram of an error accumulation in a cooperative positioning.

In step S40, the positioning comparing module 14 in the present invention can be implemented to combine many coordinates in different neighbor vehicles. For example, with reference to FIG. 8, in the first vehicle 101, the rest of the vehicles 102-104 will sense the object in the environmental area and share to the first vehicle 101. The first vehicle will receive many coordinates related to the same object (such as the second vehicle 102) and store the coordinates in a buffer. Therefore, the positioning comparing module 14 within the first vehicle 101 will acquire the coordinates of the similar object in the buffer and combine the coordinates to be single one position information. Different object coordinates are added solely. One of the combining methods is to use a K-Means clustering algorithm to calculate a mean value of the coordinates. The vehicle optimizing coordinates for a vehicle are averaged to acquire a vehicle representative coordinate and the object optimizing coordinates for an object are averaged to acquire an object representative coordinate.

In summary, the vehicle cooperative object positioning optimization method includes following advantages:

1. The detected information between the local vehicle and the neighbor vehicle can be exchanged to expand the sensing range in each of the vehicles so as to receive more environmental information.

2. The coordinate information of the object and the vehicle is adjusted by the cooperative positioning apparatus. When only the coordinate information detected by the GPS receiver is considered, more accurate coordinates can be acquired in the present invention. No matter the present invention is implemented in automatic pilot system or the condition to warn the driver about the environmental area in advance, the driving safety can be enhanced.

3. By using the coordinative positioning method in the present invention, when the optimizing calculation of the local vehicle is finished, the optimized positioning information of the local vehicle, the optimized positioning information of the neighbor vehicle and the optimized at least one object positioning information can be acquired. Three pieces of information can be transmitted to the environmental neighbor vehicles in a format of BSM information package. When the neighbor vehicle receives the BSM information package, the optimizing calculation of the present invention can be performed solely. Therefore, the environmental vehicles can be calculated separately. With the gradual accumulation of time, the accuracy of the positioning information among the vehicles will be gradually increased.

What is claimed is:

1. An optimizing method for vehicle cooperative object positioning, the optimizing method performed by a cooperative positioning apparatus installed within a local vehicle and comprising steps of:
    receiving an information package by the local vehicle, wherein the information package has a vehicle original coordinate and at least one object original coordinate provided by one of a plurality of neighbor vehicles, and the vehicle original coordinate and the at least one object original coordinate respectively having different positioning accuracies;
    performing a time delay compensation for the vehicle original coordinate and the at least one object original coordinate to acquire a vehicle compensated coordinate and an object compensated coordinate of said one of the neighbor vehicles respectively;
    performing an optimizing procedure, and the optimizing procedure having:
        comparing a vehicle original coordinate of the local vehicle and the vehicle original coordinate of said one of the neighbor vehicles to determine which one of the vehicle coordinates of the local vehicle and said one of the neighbor vehicles has a higher positioning accuracy;
        performing an optimizing calculation for the vehicle original coordinate that has the higher positioning accuracy at first, and then performing the optimizing calculation for the vehicle original coordinate that has a lower positioning accuracy, wherein the optimizing calculation comprises:
            (a) calculating a plurality of reference positions in accordance with the vehicle original coordinate of the local vehicle and the vehicle compensated coordinate of said one of the neighbor vehicles; and
            (b) calculating vehicle optimizing coordinates of the local vehicle and said one of the neighbor vehicles in accordance with a plurality of weights of the reference positions;
        optimizing the object compensated coordinates of the local vehicle and said one of the neighbor vehicles and the optimizing step comprising steps of:
            comparing the vehicle original coordinate and the vehicle optimizing coordinate of said one of the neighbor vehicles to obtain a first difference;
            compensating the object original coordinate provided by said one of the neighbor vehicles in accordance with the first difference to acquire an object optimizing coordinate of said one of the neighbor vehicles;
            comparing the vehicle original coordinate and the vehicle optimizing coordinate of the local vehicle to obtain a second difference;
            compensating the object original coordinate provided by the local vehicle in accordance with the second difference to acquire an object optimizing coordinate of the local vehicle.

2. The method as claimed in claim 1 further comprising a cooperative comparison and combination step after the optimizing procedure is performed;
    wherein the cooperative comparison and combination step is to compare the vehicle optimizing coordinates and the object optimizing coordinates acquired from the plurality of the neighbor vehicles, and average all the vehicle optimizing coordinates corresponding to said one of the neighbor vehicles to obtain a vehicle representative coordinate for the neighbor vehicle, and average all the object optimizing coordinates corresponding to an object to obtain an object representative coordinate for the object.

3. The method as claimed in claim 1, wherein the vehicle original coordinate of the local vehicle and the vehicle original coordinates of the neighbor vehicles are respectively outputted from a GPS receiver installed in the local vehicle and a GPS receiver installed in said one of the neighbor vehicles.

4. The method as claimed in claim 2, wherein the vehicle original coordinate of the local vehicle and the vehicle original coordinates of the neighbor vehicles are respectively outputted from a GPS receiver installed in the local vehicle and a GPS receiver installed in said one of the neighbor vehicles.

5. The method as claimed in claim 3, wherein the step of comparing the vehicle original coordinate of the local vehicle and the vehicle original coordinate of the neighbor vehicle to determine which one has the higher positioning accuracy is to compare the positioning accuracies of the GPS receivers in the local vehicle and the neighbor vehicles.

6. The method as claimed in claim 4, wherein the step of comparing the vehicle original coordinate of the local vehicle and the vehicle original coordinate of the neighbor vehicle to determine which one has the higher positioning accuracy is to compare the positioning accuracy of the GPS receivers in the local vehicle and the neighbor vehicle.

7. The method as claimed in claim 5, wherein the step of performing the time delay compensation is to calculate a compensation movement of the local vehicle due to a delay time between a transmitting time and a receiving time of the information package, and add the vehicle original coordinate of said one of the neighbor vehicles to the compensation movement to acquire a vehicle compensated coordinate of the local vehicle 8. The method as claimed in claim 6, wherein the step of performing the time delay compensation is to calculate a compensation movement of the local vehicle due to a delay time between a transmitting time and a receiving time of the information package, and add the vehicle original coordinate of said one of the neighbor vehicles to the compensation movement to acquire a vehicle compensated coordinate of the local vehicle.

9. The method as claimed in claim 7, wherein said one of the neighbor vehicles uses the vehicle original coordinate outputted by the GPS receiver as a base position, and the reference positions include:
    a first reference position being the vehicle original coordinate outputted by the GPS receiver in the local vehicle;
    a second reference position, wherein the second reference position is obtained by steps of:
        sensing the relative coordinate of the local vehicle by a sensor of the neighbor vehicle; and converting the relative coordinate to obtain a latitude and longitude coordinate by using the base position as a reference point to acquire the second reference position;

a third reference position, wherein the third reference position is obtained by steps of:
  detecting a relative distance and a relative angle of the neighbor vehicle by the sensor in the local vehicle; and
  converting the relative distance and the relative angle to obtain the latitude and longitude coordinate by using the base position as the reference point to acquire the third reference position.

10. The method as claimed in claim 8, wherein said one of the neighbor vehicles uses the vehicle original coordinate outputted by the GPS receiver as a base position, and the reference positions include:
  a first reference position being the vehicle original coordinate outputted by the GPS receiver in the local vehicle;
  a second reference position, wherein the second reference position is obtained by steps of:
    sensing the relative coordinate of the local vehicle by a sensor of the neighbor vehicle; and
    converting the relative coordinate to obtain a latitude and longitude coordinate by using the base position as a reference point to acquire the second reference position;
  a third reference position, wherein the third reference position is obtained by steps of:
    detecting a relative distance and a relative angle of the neighbor vehicle by the sensor in the local vehicle; and
    converting the relative distance and the relative angle to obtain the latitude and longitude coordinate by using the base position as the reference point to acquire the third reference position.

11. The method as claimed in claim 9, wherein the vehicle optimizing coordinate is calculated by an equation of:

$$H(x, y) = \left(\sum_{i=1}^{m} \omega_i * x_i\right), \left(\sum_{i=1}^{m} \omega_i * y_i\right),$$

where
  m is a quantity of the reference positions;
  $(x_i, y_j)$ are coordinates for the first reference position, the second reference position, and the third reference position; and
  $\omega_i$ are the weights of the reference positions.

12. The method as claimed in claim 10, wherein the vehicle optimizing coordinate is calculated by an equation of:

$$H(x, y) = \left(\sum_{i=1}^{m} \omega_i * x_i\right), \left(\sum_{i=1}^{m} \omega_i * y_i\right),$$

where
  m is a quantity of the reference positions;
  $(x_i, y_j)$ are coordinates for the first reference position, the second reference position, and the third reference position; and
  $\omega_i$ are the weights of the reference positions.

13. The method as claimed in claim 11, wherein the information package is a basic safety message (BSM) package.

14. The method as claimed in claim 12, wherein the information package is a basic safety message (BSM) package.

15. The method as claimed in claim 11, wherein the weights of the reference positions are determined by the accuracies of the sensors that are used to generate the reference positions.

16. The method as claimed in claim 12, wherein the weights of the reference positions are determined by the accuracies of the sensors that are used to generate the reference positions.

* * * * *